(12) United States Patent
Blanchard et al.

(10) Patent No.: US 9,963,299 B2
(45) Date of Patent: May 8, 2018

(54) SINGLE FLIGHT SCREW, A SINGLE FLIGHT HIGH PRESSURE SCREW PUMP AND COMPACTOR CONTAINING SUCH A PUMP

(71) Applicants: Kenneth Blanchard, Sanford, MI (US); Terry Duperon, Saginaw, MI (US)

(72) Inventors: Kenneth Blanchard, Sanford, MI (US); Terry Duperon, Saginaw, MI (US)

( * ) Notice: Subject to any disclaimer, the term of this patent is extended or adjusted under 35 U.S.C. 154(b) by 329 days.

(21) Appl. No.: 14/314,619

(22) Filed: Jun. 25, 2014

(65) Prior Publication Data

US 2015/0017048 A1   Jan. 15, 2015

Related U.S. Application Data

(60) Provisional application No. 61/842,049, filed on Jul. 2, 2013.

(51) Int. Cl.
| | |
|---|---|
| F03C 2/00 | (2006.01) |
| F03C 4/00 | (2006.01) |
| F04C 2/00 | (2006.01) |
| B65G 33/22 | (2006.01) |
| F04C 2/16 | (2006.01) |
| F01C 1/16 | (2006.01) |
| C02F 11/12 | (2006.01) |
| B30B 9/12 | (2006.01) |
| B30B 9/18 | (2006.01) |

(52) U.S. Cl.
CPC ............... *B65G 33/22* (2013.01); *B30B 9/12* (2013.01); *B30B 9/121* (2013.01); *B30B 9/18* (2013.01); *C02F 11/125* (2013.01); *F01C 1/16* (2013.01); *F04C 2/16* (2013.01)

(58) Field of Classification Search
CPC ...... F04C 18/16; F04C 18/107; F04C 2/1073; F04C 2/16; F04C 2/107; F04C 23/008; B65G 33/00; B65G 33/22; B65G 33/26; F01C 1/16; B30B 9/12; B30B 9/121; B30B 9/18; C02F 11/125
USPC ................ 418/202, 201.1; 415/71–73, 208.2
See application file for complete search history.

(56) References Cited

U.S. PATENT DOCUMENTS

| | | | | |
|---|---|---|---|---|
| 1,683,010 | A * | 9/1928 | Anderson | F04D 3/02 |
| | | | | 415/72 |
| 2,119,162 | A * | 5/1938 | Hartner | B30B 9/16 |
| | | | | 100/146 |
| RE24,079 | E * | 10/1955 | Mateer | F04C 2/1071 |
| | | | | 418/48 |
| 2,916,769 | A * | 12/1959 | Baigent | B29C 45/50 |
| | | | | 417/206 |
| 3,062,129 | A | 11/1962 | Wandel | |
| 3,760,717 | A | 9/1973 | DeMilt et al. | |
| 4,520,724 | A | 6/1985 | Costarelli | |
| 4,779,528 | A | 10/1988 | Bruke | |
| 5,337,658 | A | 8/1994 | Bruke | |
| 5,611,268 | A | 3/1997 | Hamilton | |

(Continued)

FOREIGN PATENT DOCUMENTS

EP   0797922 A2 * 10/1997 ............ A23G 1/202

*Primary Examiner* — Theresa Trieu

(57) ABSTRACT

A single flight screw, a single flight high pressure screw pump and the use of the pump in a compactor for compacting and dewatering debris commonly found in waste water. The bore, screw diameter and the flight spacing are constant and the compression force is mostly axial. The work is done at the very end of the screw.

6 Claims, 4 Drawing Sheets

(56) References Cited

U.S. PATENT DOCUMENTS

| | | | |
|---|---|---|---|
| 5,662,035 A * | 9/1997 | Lee | B01D 29/25 100/112 |
| 6,550,376 B2 | 4/2003 | Johnston | |
| 6,877,967 B2 * | 4/2005 | Gantenhammer | F04C 2/1073 418/48 |
| 7,985,820 B2 | 6/2011 | Duperon | |

* cited by examiner

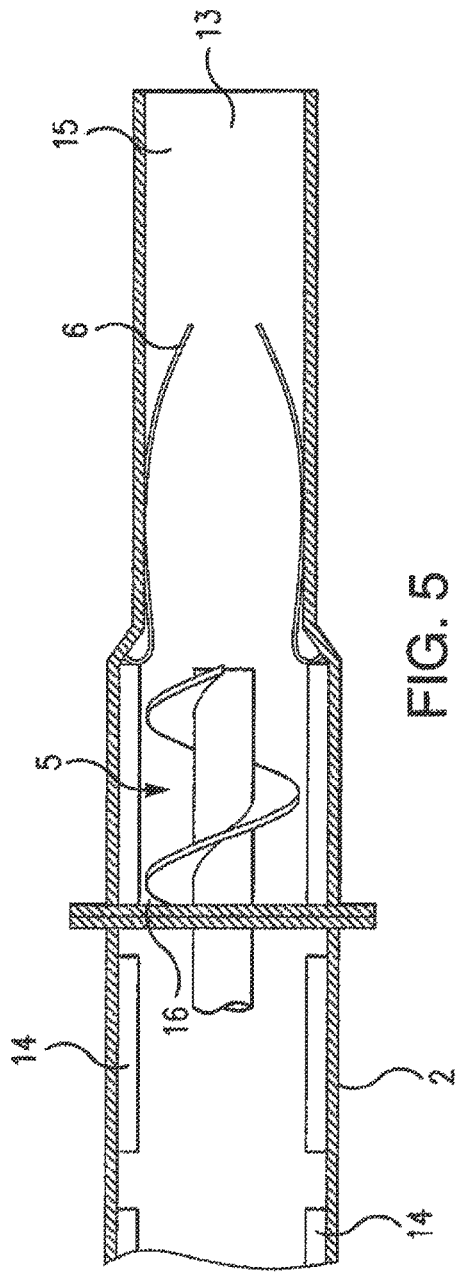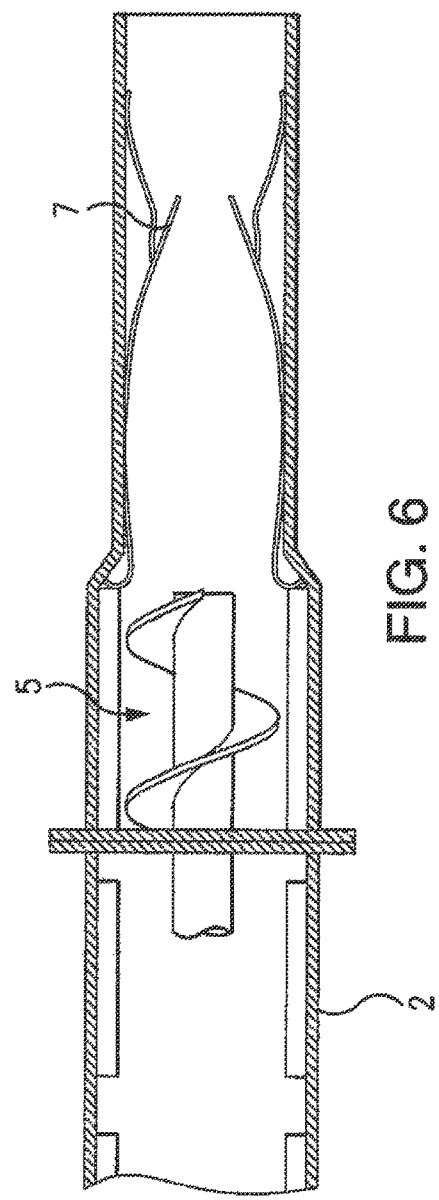

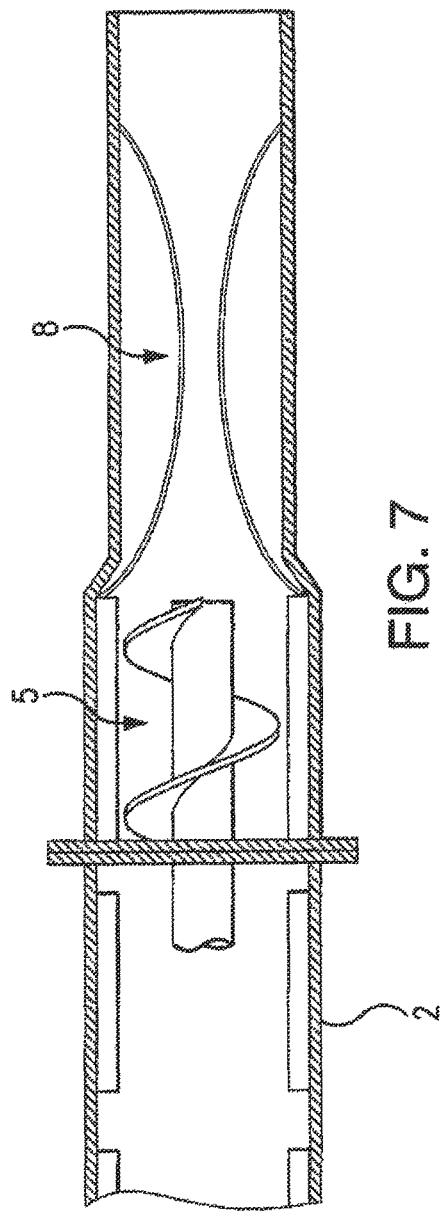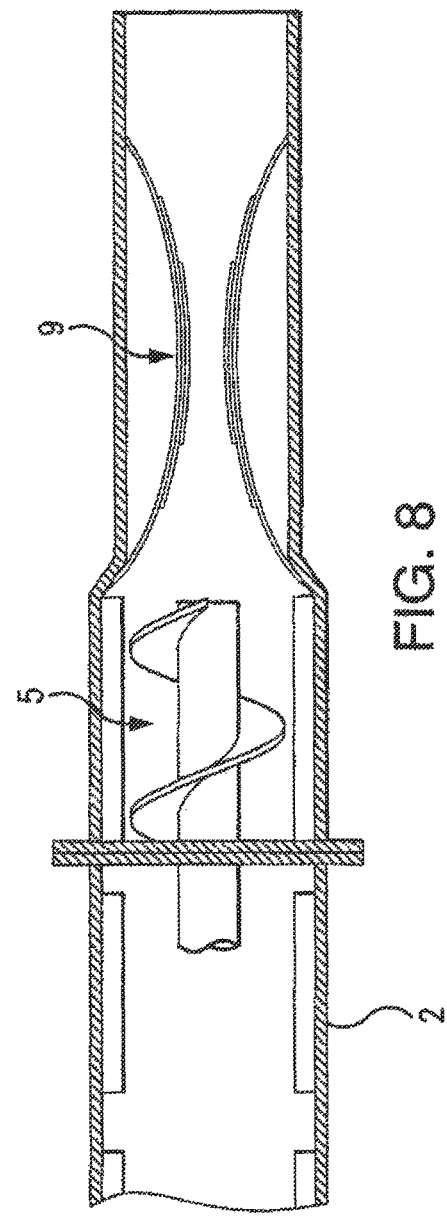

SINGLE FLIGHT SCREW, A SINGLE FLIGHT HIGH PRESSURE SCREW PUMP AND COMPACTOR CONTAINING SUCH A PUMP

This invention deals with a single flight screw, a single flight high pressure screw pump and the use of the pump in a compactor for compacting and dewatering debris commonly found in waste water.

In this invention, the bore, screw diameter and the flight spacing are constant and the compression force is mostly axial. The work is done at the very end of the screw.

BACKGROUND OF THE INVENTION

In solids/liquids separation equipment a driven screw (Archimedes) is commonly used for the conveyance and compression of materials requiring high pressure for the separation of the liquids from the solids material. One such application would be an oil screw press which generates a mostly radial compression force by reducing the flight spacing and/or the bore diameter in conjunction with the screw diameter.

When a single flight screw is utilized in a high pressure pump application, a radial load occurs due to the high percentage of the tangential load that is focused along a single plane perpendicular to the axis of the screw center. As the axial load increases, the tangential load imbalance increases producing a greater radial load that increases exponentially.

Typical methods of neutralizing the radial loads are double flight methods. The first being double flights along the entire length of the screw ending 180° apart in the same perpendicular plane, one other being a second flight commencing from the same perpendicular plane as the primary discharge end at 180° to the primary flight and wraps helically back along only a portion of the screw.

These two methods successfully neutralize damaging radial loads. Both methods have negative aspects that make them impractical for Washer Compactor application. The first method requires the two flights to be wrapped helically at a very steep incline plane in order to achieve the flight spacing needed. The angle at which the flight end pushes the debris into the high pressure zone is inefficient causing the power requirements to increase beyond acceptable limits.

The second method utilizes an acceptable incline plane on the primary flight to achieve the proper flight spacing, however, the second flight portion used to balance the loads at the end of the screw effectively cuts the flight spacing in half creating a jam point for large debris that has been allowed to enter the screw. The only way around this is to preprocess the debris though a grinder before it enters the screw, thus controlling the debris size. In applications where the expense and need for a grinder is unwarranted, a single flight screw is the preferred method.

With regard to U.S. Pat. No. 7,958,820, that issued to Terry Duperon on Jun. 14, 2011, the novel screw end design utilized is engineered to balance the tangential loads with balanced axial loading along a single flight, eliminating the corresponding radial load. By eliminating the radial load, the power input requirements are reduced by as much as 40% in this particular application of the technology.

In order to balance the tangential loads, the screw end is designed to produce 50% of the tangential force at the screw flight end. The remaining 50% is produced 180° radially from the screw flight end in a position that is one half of a lead frost the end along the same incline plane. This patent is hereby incorporated by reference for what it teaches about the manufacture and use of compactors.

Other prior art devices can be found in U.S. Pat. No. 3,062,129, that issued to Wandel on Nov. 6, 1962; U.S. Pat. No. 3,760,717, that issued to Demilt, et al on Sep. 25, 1973; U.S. Pat. No. 4,520,724, that issued to Costarelli on Jun. 4, 1985; U.S. Pat. No. 4,779,528, that issued to Bruke on Oct. 25, 1988; U.S. Pat. No. 5,337,658, that issued to Bruke on Aug. 16, 1934; U.S. Pat. No. 5,611,268, that issued to Hamilton on Mar. 18, 1997, and U.S. Pat. No. 6,550,376, that issued to Johnston on Apr. 22, 2003.

THE INVENTION

Thus, what is disclosed and claimed herein in one embodiment is a single flight screw. The screw comprises a shaft having two ends, wherein the shaft has a single flight helical wrapped around said shaft in an inclined plane, essentially from one end of the shaft to the opposite end of the shaft. The single flight helical has a front end with a terminating end wherein the front end of the single flight helical, at the terminating flight, is cut such that the height of such flight is 30 to 70 percent of the height of the remainder of said helical flight.

In another embodiment, there is a single flight, high pressure screw pump comprising an screw housing having a front opening and a back and located within the screw housing is an screw as set forth just Supra.

In a further embodiment, there is a single flight, high pressure screw pump as set forth just supra, wherein, in addition, the screw housing is hued with intermittent linear supports and the screw housing has mounted on it, at the front, a spring housing. The spring housing has an open back end and an open front end. Contained in the spring housing is a resistant spring assembly, comprising opposing convex single leaf spring, elements, the spring is shown in FIG. 5.

In addition, there is an embodiment that, is a single flight, high pressure screw pump as set forth just supra, wherein, in addition, the screw housing is lined with intermittent linear supports. Further, the screw housing has mounted on it, at the front, a spring housing. The spring housing has an open back end and an open front end.

There is contained in the spring housing a resistant spring assembly comprising opposing leaf spring elements, each convex leaf spring element being opposed by surmounted opposing single leaf elements, the spring assembly is as shown in FIG. 6.

Going still further, in another embodiment, there is a single flight, high pressure screw pump as set for Supra, wherein, in addition, the screw housing is lined with intermittent linear supports. The screw housing has mounted on it, at the front, a spring housing. The spring housing has an open back end and an open front end. There is contained in the spring housing a resistant spring assembly opposed concave single leaf spring elements, wherein the spring assembly is as shown in FIG. 7.

An additional embodiment is a single flight, high pressure screw pump as set forth Supra, wherein, in addition, the screw housing is lined with intermittent linear supports and the screw housing has mounted on it, at the front, a spring housing. The spring housing has an open back end and an open front end. There is also contained in the spring housing a resistant spring assembly opposed concave layered multiple leaf spring elements, the spring assembly is as shown in FIG. 8.

BRIEF DESCRIPTION OF THE DRAWINGS

FIG. 5 is a cross section view through line A-A of FIG. 1 showing one embodiment of the spring assembly in the spring housing.

FIG. 6 is a cross section view through line A-A of FIG. 1 showing a second embodiment of the spring assembly in the spring housing.

FIG. 7 is a cross section view through line A-A of FIG. 1 showing a third embodiment of the spring assembly in the spring housing.

FIG. 8 is a cross section view through line A-A of FIG. 1 showing a fourth embodiment of the spring assembly in the spring housing.

DETAILED DESCRIPTION OF THE DRAWINGS

Figure 1:
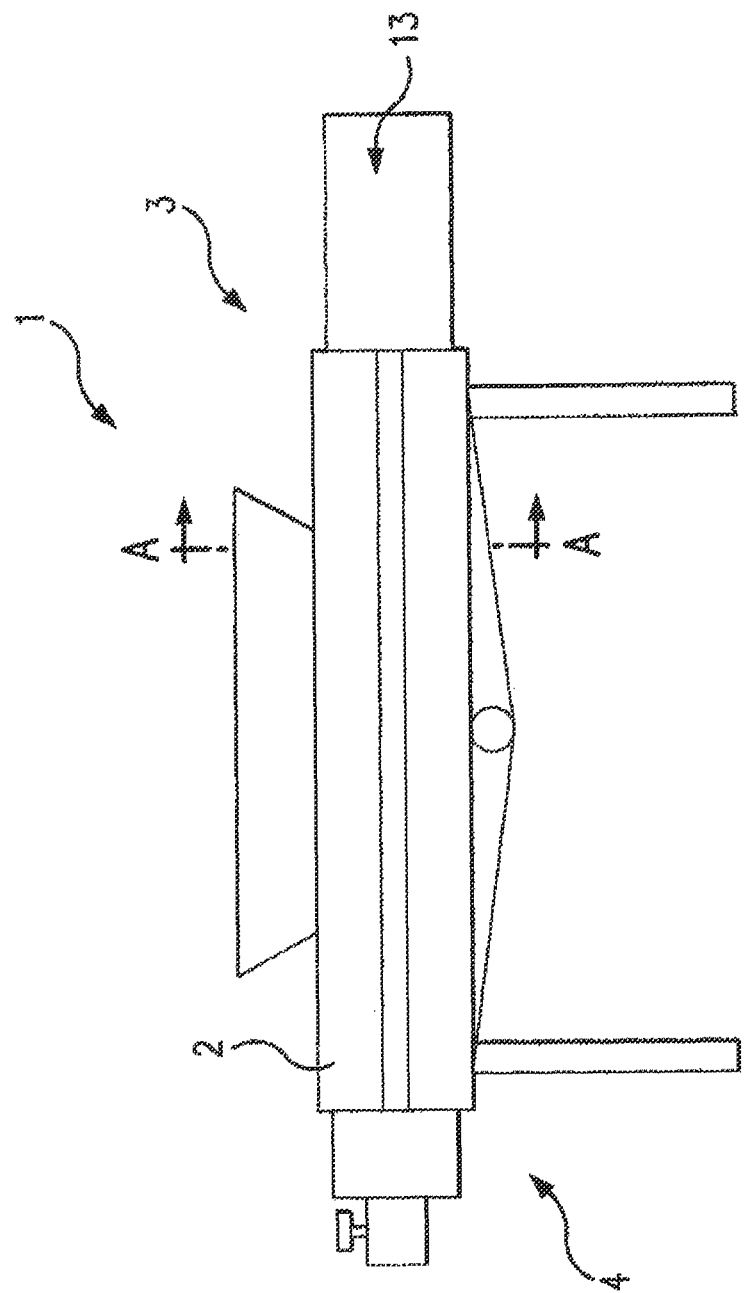
FIG. 1 is a full side view of a general compactor used in the industry showing a spring assembly housing of this invention.

When utilizing a driven screw in the above mentioned configuration for the purposes of solids/liquids separation, it is critical to prevent low pressure pathways in the high pressure solids material that is being expelled. In this particular application, the high pressure solids material that is being expelled forms a "plug" that prevents the re-absorption of the separated liquid. This forces the liquids to travel back toward the drain via the path of least resistance.

In the application where the compression is being done at the end of the screw, a simply terminated (cut perpendicularly to the axial centerline) screw center shaft will form a low pressure area that continues into the high pressure plug. This becomes a pathway for the separated liquids to reenter the solids material, thus reducing the efficiency of the process. The dynamics of this are explained by how the material is compressed as it leaves the end of the screw.

As the material travels toward the end of the screw, the forces that, begin to compress the material are mostly axial and radial. Just before the material reaches the very end of the screw flight, there is a significant radial force that occurs as the material becomes more confined and attempts to flow toward a lower pressure area. As the material leaves the end of the screw flight, the force is nearly all axial. The material is compressed against the center shaft by the radial force, forming a hard walled void which is then moved forward by the axial force from the trailing edge of the screw flight similar to an extrusion process. In order to eliminate the formation of a low pressure area and increase the process efficiency, the screw shaft and must be reconfigured in a way to move the solids material into that space.

The purpose of this configuration is to utilize the increased radial force that occurs just before the material leaves the end of the screw to effectively move the material into the space that would otherwise be a void. The end of the screw shaft is cut in a single plane at an angle that correlates with the flight lead and the resulting plane is rotationally positioned in a manner that allows the material under a radial force to flow from the incline plane of the screw flight to angled plane of the screw shaft end, filling the space.

An issue that must be managed in any screw pump is the "slip flow". This dynamic occurs as the discharge pressure rises while the back flow increases. The screw-pump bore tolerances and the pump bore length are the two major elements that need to be controlled to effect the pumping efficiency of the unit.

Washer compactors utilize three methods of compaction; regulated, unregulated and self-regulating. Regulated methods incorporate some sort of mechanical control system such as hydraulics with a pressure or power sensor. These systems can be controlled very well and achieve high dry solids content at the expense of significantly increased cost to manufacture and maintain. Unregulated methods utilize a fixed or manually adjustable compaction zone. An example of a fixed compaction zone would be a tight elbow immediately after the screw or screws.

This configuration requires a high tolerance to flow and debris Variation. The result is a dry solids content that will vary by +/−20 points. A manually adjustable compaction zone requires an adjustment to prevent under or over compacting (jamming) the debris. This gives a relatively good dry solids output for a narrow range of input debris.

A self-regulating method of compaction can produce high dry solids output for a wide range of debris without the need for adjustment. This is usually accomplished with some sort of spring, e.g. metal, air or gas.

The end configuration of the single flight, self-balancing, high pressure screw pump is critical to the operation of the compactor configuration, in that, it can generate very high pressures without generating damaging radial loads. Very high pressures are necessary to separate the liquids content from the solids material to achieve dry solids content in the approximate 60% range, especially in debris that is very absorbent.

FIG. 1 shows a general compactor 1 which, is comprised of a housing 2, a forward end 3, and a trailing end 4. FIGS. 5, 6, 7, and 8 show a portion of single flight screw 5, inside the housing 2. Each of the FIGS. 5, 6, 7, and 8 show a different spring assembly 6, 7, 8, and 9, respectively.

Figure 2:
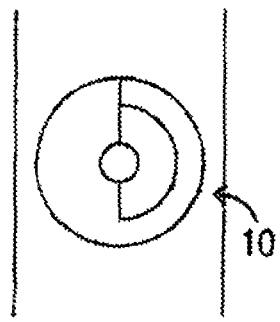
FIG. 2 is a schematic end view of the front end of a single flight helical screw within the screw housing.
Figure 3:
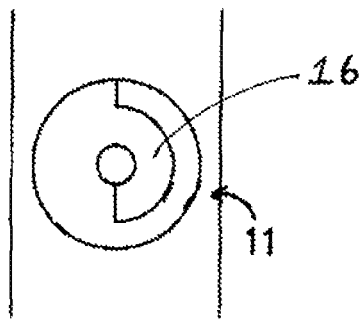
FIG. 3 is a schematic end view of the front end of the single flight helical screw showing the terminal end of the flight being cut to 70% of the height of the single flight screw normal height.
Figure 4:
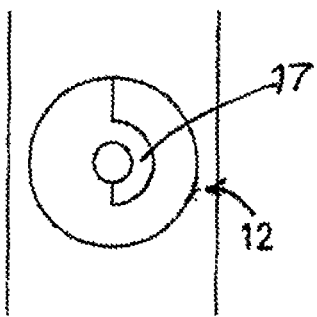
FIG. 4 is a schematic end view of the front end of the single flight helical screw showing the terminal end of the flight being cut to 30% of the height of the single flight screw normal height.

FIG. 2 shows a schematic end view of the front end of a single flight helical screw 10 within the screw housing. FIG. 3 shows a schematic end view of the front end of the single flight helical screw 11 showing the terminal end 16 of the flight being cut to 70% of the height of the single flight screw normal height, and, FIG. 4 shows a schematic end view of the front end of the single flight helical screw 12 showing the terminal end 17 of the flight being cut to 30% of the height of the single flight screw normal height.

FIG. 5 shows the intermittent linear supports 14 in the housing 2, the spring housing open front end 13 and the spring housing 15.

What is claimed is:

1. A single flight screw, said screw comprising a shaft having two ends, said shaft having a single flight helical wrapped around said shaft in an inclined plane essentially from one end of said shaft to the opposite end of said shaft, said single flight helical having a height, said single flight screw having a front end with a terminating helical wherein said front end of said single flight screw, from said shaft, at said terminating end, is cut such that it has a vertical height of said flight is 30 to 70 percent of the height of the single flight helical wrapped around the shaft from one end of the shaft to the opposite end.

2. The single flight, high pressure screw pump comprising a screw housing having a front opening and a back and located within said screw housing, a screw as claimed in claim 1.

3. The single flight, high pressure screw pump as claimed in claim 2, wherein, in addition,
   a. the screw housing is lined with intermittent linear supports;
   b. said screw housing having mounted on it at the front a spring housing, said spring housing having an open back end and an open front end;
   c. contained in said spring housing a resistant spring assembly comprising opposing Convex single leaf spring elements.

4. The single flight, high pressure screw pump as claimed in claim 2, wherein, in addition,
   a. the screw housing is lined with intermittent linear supports;
   b. said screw housing having mounted on it at the front a spring housing, said spring housing having an open back end and an open front end;
   c. contained in said spring housing a resistant spring assembly comprising opposing leaf spring elements, each convex leaf spring element being opposed by surmounted opposing single leaf elements.

5. The single flight, high pressure screw pump as claimed in claim 2, wherein, in addition,
   a. the screw housing is lined with intermittent linear supports;
   b. said screw housing having mounted on it at the front a spring housing, said spring housing having an open back end and an open front end;
   c. contained in said spring housing a resistant spring assembly opposed concave single leaf spring elements.

6. The single flight, high pressure screw pump as claimed in claim 2, wherein, in addition,
   a. the screw housing is lined with intermittent linear supports;
   b. said screw housing having mounted on it at the front a spring housing, said spring housing having an open back end and an open front end; contained in said spring housing a resistant spring assembly opposed concave layered multiple leaf spring elements.

* * * * *